(12) United States Patent
Schäfer et al.

(10) Patent No.: US 12,190,233 B2
(45) Date of Patent: Jan. 7, 2025

(54) DATA STYLE TRANSFORMATION WITH ADVERSARIAL MODELS

(71) Applicant: LEVERTON HOLDING LLC, Solon, OH (US)

(72) Inventors: Christian Schäfer, Berlin (DE); Florian Kuhlmann, Berlin (DE)

(73) Assignee: LEVERTON HOLDING LLC, Solon, OH (US)

( * ) Notice: Subject to any disclaimer, the term of this patent is extended or adjusted under 35 U.S.C. 154(b) by 1039 days.

(21) Appl. No.: 17/111,072

(22) Filed: Dec. 3, 2020

(65) Prior Publication Data

US 2021/0166125 A1 Jun. 3, 2021

Related U.S. Application Data

(60) Provisional application No. 62/942,872, filed on Dec. 3, 2019.

(51) Int. Cl.
*G06N 3/08* (2023.01)
*G06N 3/045* (2023.01)
*G06V 10/82* (2022.01)
*G06V 20/62* (2022.01)
*G06V 30/19* (2022.01)
*G06V 30/413* (2022.01)
*G06V 30/10* (2022.01)

(52) U.S. Cl.
CPC ............... *G06N 3/08* (2013.01); *G06N 3/045* (2023.01); *G06V 10/82* (2022.01); *G06V 20/62* (2022.01); *G06V 30/19013* (2022.01); *G06V 30/19147* (2022.01); *G06V 30/413* (2022.01); *G06V 30/10* (2022.01)

(58) Field of Classification Search
None
See application file for complete search history.

(56) References Cited

U.S. PATENT DOCUMENTS 9,263,036 B1 2/2016 Graves
10,803,646 B1* 10/2020 Bogan, III ............. G06V 10/82
10,810,721 B2* 10/2020 Mech ........................ G06N 3/08
2004/0022123 A1 11/2004 Foote et al.
(Continued)

OTHER PUBLICATIONS

The Extended European Search Report dated Nov. 8, 2023 issued for European Patent Application No. 20895706.8.
(Continued)

*Primary Examiner* — Alan Chen
(74) *Attorney, Agent, or Firm* — K&L Gates LLP

(57) ABSTRACT

Systems and methods for transforming data between multiple styles are provided. In one embodiment, a system is provided that includes a generator model, a discriminator model, and a preserver model. The generator model may be configured to receive data in a first style and generate converted data in a second style. The discriminator model may be configured to receive the converted data from the generator model, compare the converted data to original data in the second style, and compute a resemblance measure based on the comparison. The preserver model may be configured to receive the converted data from the generator model and compute an information measure of the converted data. The generator model may also be trained to optimize the resemblance measure and the information measure.

29 Claims, 7 Drawing Sheets

(56) References Cited

U.S. PATENT DOCUMENTS

| | | |
|---|---|---|
| 2005/0006064 A1 | 3/2005 | Glass et al. |
| 2014/0014605 A1 | 1/2014 | Kilgore et al. |
| 2017/0006125 A1 | 1/2017 | Yasuma et al. |
| 2019/0171908 A1* | 6/2019 | Salavon ................ G06N 3/088 |
| 2019/0318474 A1 | 10/2019 | Han |
| 2020/0218937 A1* | 7/2020 | Visentini Scarzanella ................. G06V 10/774 |
| 2021/0303925 A1* | 9/2021 | Hofmann ............... G06V 20/56 |

OTHER PUBLICATIONS

Bhunia et al., "Improving Document Binoarization via Adversarial Noise-Texture Augmentation", 2019 IEEE International Conference on Image Processing (ICIP), IEEE, 22 Sep. 22, 2019, pp. 2721-2725.

International Search Report and Written Opinion dated Feb. 24, 2021 issued for International PCT Application No. PCT/US2020/062838 filed Dec. 2, 2020.

\* cited by examiner

DATA STYLE TRANSFORMATION WITH ADVERSARIAL MODELS

CROSS-REFERENCE TO RELATED APPLICATION

The present application claims priority to U.S. Provisional Application No. 62/942,872 filed on Dec. 3, 2019, the disclosure of which is incorporated herein by reference for all purposes.

BACKGROUND

Data is often needed in particular styles to be accurately processed. For example, computer systems may require data of different types to be in different styles, or of a certain quality, to accurately extract information from the data. In another example, data of a particular style may be necessary to prepare or improve computer processes that refine data. In certain instances, this data can include image data, audio data, and text data.

SUMMARY

The present disclosure presents new and innovative systems and methods for transforming data between multiple styles. In a first aspect, a system is provided comprising a processor and a memory. The memory may store instructions which, when executed by the processor, cause the processor to implement a generator model configured to receive data in a first style and generate converted data in a second style and a discriminator model configured to receive the converted data from the generator model, compare the converted data to original data in the second style, and compute a resemblance measure based on the comparison. The memory may store further instructions which, when executed by the processor, cause the processor to further implement a preserver model configured to receive the converted data from the generator model and compute an information measure of the converted data. The generator model may be trained to optimize the resemblance measure and the information measure.

In a second aspect according to the first aspect, the discriminator model is further configured to receive the converted data and the original data and classify data items within the converted data and data items within the original data as being in the first style or the second style. The resemblance measure may be computed based on the proportion of data items within the converted data classified as being in the second style.

In a third aspect according to any of the first and second aspects, the preserver model is further configured to recognize information within the converted data and compute the information measure based on a proportion of the converted data for which information is recognized.

In a fourth aspect according to any of the first through third aspects the memory contains further instructions which, when executed by the processor, cause the processor to iteratively train the generator model based on either the resemblance measure or the information measure.

In a fifth aspect according to the fourth aspect, the memory contains further instructions which, when executed by the processor while training the generator model based on the resemblance measure cause the processor to receive, at the generator model, first training data in the first style and generate first converted training data in the second style and receive, at the discriminator model, the first converted training data, compare the first converted training data to the original data, and compute a training resemblance measure based on the comparison. The memory may contain still further instructions which, when executed by the processor while training the generator model based on the resemblance measure cause the processor to receive the training resemblance measure and update the generator model based on the training resemblance measure.

In a sixth aspect according to the fifth aspect, the generator model is trained based on the training resemblance measure until the training resemblance measure exceeds a first predetermined threshold.

In a seventh aspect according to any of the fourth through sixth aspects, the memory contains further instructions which, when executed by the processor while training the generator model based on the information measure, cause the processor to receive, at the generator model, second training data in the first style and generate second converted training data in the second style, receive, at the preserver model, the second converted training data and compute a training information measure of the second converted training data, and receive the training information measure and update the generator model based on the training information measure.

In an eighth aspect according to the seventh aspect, the generator model is trained based on the training information measure until the training information measure exceeds a second predetermined threshold.

In a ninth aspect according to any of the fourth through eighth aspects, one or both of the discriminator model and the preserver model are separately trained prior to training the generator model.

In a tenth aspect according to any of the first through ninth aspects, data in the first style includes one or more types of data selected from the group consisting of: images of high quality, text images in a first font, images of low quality, spoken audio of low quality, spoken audio in a first language, video of high quality, and video of a low quality. Data in the second styles may include one or more types of data selected from the group consisting of: images of lower quality, text images in a second font, images of higher quality, spoken audio of higher quality, spoken audio in a second language, video of lower quality, and video of higher quality.

In an eleventh aspect according to the tenth aspect, data in the first style includes high-quality text images and data in the second style includes text images of lower quality to resemble scanned text images.

In a twelfth aspect according to the eleventh aspect, the generator model is configured, while generating the converted data in the second style, to generate at least one image degradation resembling at least one type of error selected from the group consisting of: scanning artifacts, document damage, blurring errors, stray markings, and document blemishes.

In a thirteenth aspect according to any of the eleventh and twelfth aspects, the preserver model is configured to recognize values corresponding to characters within the converted data and compute the information measure based on the proportion of characters within the converted data for which corresponding values were successfully identified.

In a fourteenth aspect according to any of the eleventh through thirteenth aspects, the memory stores further instructions which, when executed by the processor, cause the processor to store the converted data for use in training a model configured to recognize text within scanned text images.

In a fifteenth aspect, a method is provided that includes receiving, at a generator model, data in a first style, generating, with the generator model, converted data in a second style, and comparing, with a discriminator model, the converted data to original data in the second style. The method may further include computing, with the discriminator model, a resemblance measure based on the comparison, computing, with a preserver model, an information measure of the converted data, and training the generator model to optimize the resemblance measure and the information measure.

In a sixteenth aspect according to the fifteenth aspect, the method further includes receiving, with the discriminator model, the converted data and the original data and classifying, with the discriminator model, data items within the converted data and data items within the original data as being in the first style or the second style. The resemblance measure may be computed based on the proportion of data items within the converted data classified as being in the second style.

In a seventeenth aspect according to any of the fifteenth through sixteenth aspects, the method further includes recognizing, with the preserver model, information within the converted data and computing, with the preserver model, the information measure based on a proportion of the converted data for which information is recognized.

In an eighteenth aspect according to any of the fifteenth through seventeenth aspects, the method further includes iteratively training the generator model based on either the resemblance measure or the information measure.

In a nineteenth aspect according to the eighteenth aspect, training the generator model based on the resemblance measure further includes receiving, at the generator model, first training data in the first style, generating, with the generator model, first converted training data in the second style, and comparing, with the discriminator model, the first converted training data to the original data. Training the generator model based on the resemblance measure may still further include computing, with the discriminator model, a training resemblance measure based on the comparison and updating the generator model based on the training resemblance measure.

In a twentieth aspect according to the nineteenth aspect, the generator model is trained based on the training resemblance measure until the training resemblance measure exceeds a first predetermined threshold.

In a twenty-first aspect according to any of the eighteenth through twentieth aspects, training the generator model based on the information measure further comprises receiving, at the generator model, second training data in the first style and generating, with the generator model, second converted training data in the second style. Training the generator model based on the information measure may still further comprise computing, with the preserver model, a training information measure of the second converted training data and updating the generator model based on the training information measure.

In a twenty-second aspect according to the twenty-first aspect, the generator model is trained based on the training information measure until the training information measure exceeds a second predetermined threshold.

In a twenty-third aspect according to any of the eighteenth through twenty-second aspects, one or both of the discriminator model and the preserver model are separately trained prior to training the generator model.

In a twenty-fourth aspect according to any of the fifteenth through twenty-third aspects, data in the first style includes one or more types of data selected from the group consisting of: images of high quality, text images in a first font, images of low quality, spoken audio of low quality, spoken audio in a first language, video of high quality, and video of a low quality. Data in the second style may include one or more types of data selected from the group consisting of: images of lower quality, text images in a second font, images of higher quality, spoken audio of higher quality, spoken audio in a second language, video of lower quality, and video of higher quality.

In a twenty-fifth aspect according to the twenty-fourth aspect, data in the first style includes high-quality text images and data in the second style includes text images of lower quality to resemble scanned text images.

In a twenty-sixth aspect according to the twenty-fifth aspect, generating the converted data in the second style includes generating at least one image degradation resembling at least one type of error selected from the group consisting of: scanning artifacts, document damage, blurring errors, stray markings, and document blemishes.

In a twenty-seventh aspect according to any of the twenty-fifth and twenty-sixth aspects, the method further includes recognizing, with the preserver model, values corresponding to characters within the converted data and computing, with the preserver model, the information measure based on the proportion of characters within the converted data for which corresponding values were successfully identified.

In a twenty-eighth aspect according to any of the twenty-fifth through twenty-seventh aspects, the method further includes storing the converted data for use in training a model configured to recognize text within scanned text images.

In a twenty-ninth aspect, a non-transitory, computer-readable medium is provided storing instructions which, when executed by a processor, cause the processor to receive, at a generator model, data in a first style, generate, with the generator model, converted data in a second style, and compare, with a discriminator model, the converted data to original data in the second style. The non-transitory, computer-readable medium may store further instructions which, when executed by the processor, cause the processor to compute, with the discriminator model, a resemblance measure based on the comparison, compute, with a preserver model, an information measure of the converted data, and train the generator model to optimize the resemblance measure and the information measure.

The features of the first through twenty-ninth aspects may be combined with one another in a manner which falls within the common understanding of a person skilled in the relevant art. Moreover, the features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXEMPLARY EMBODIMENTS

Figure 1:
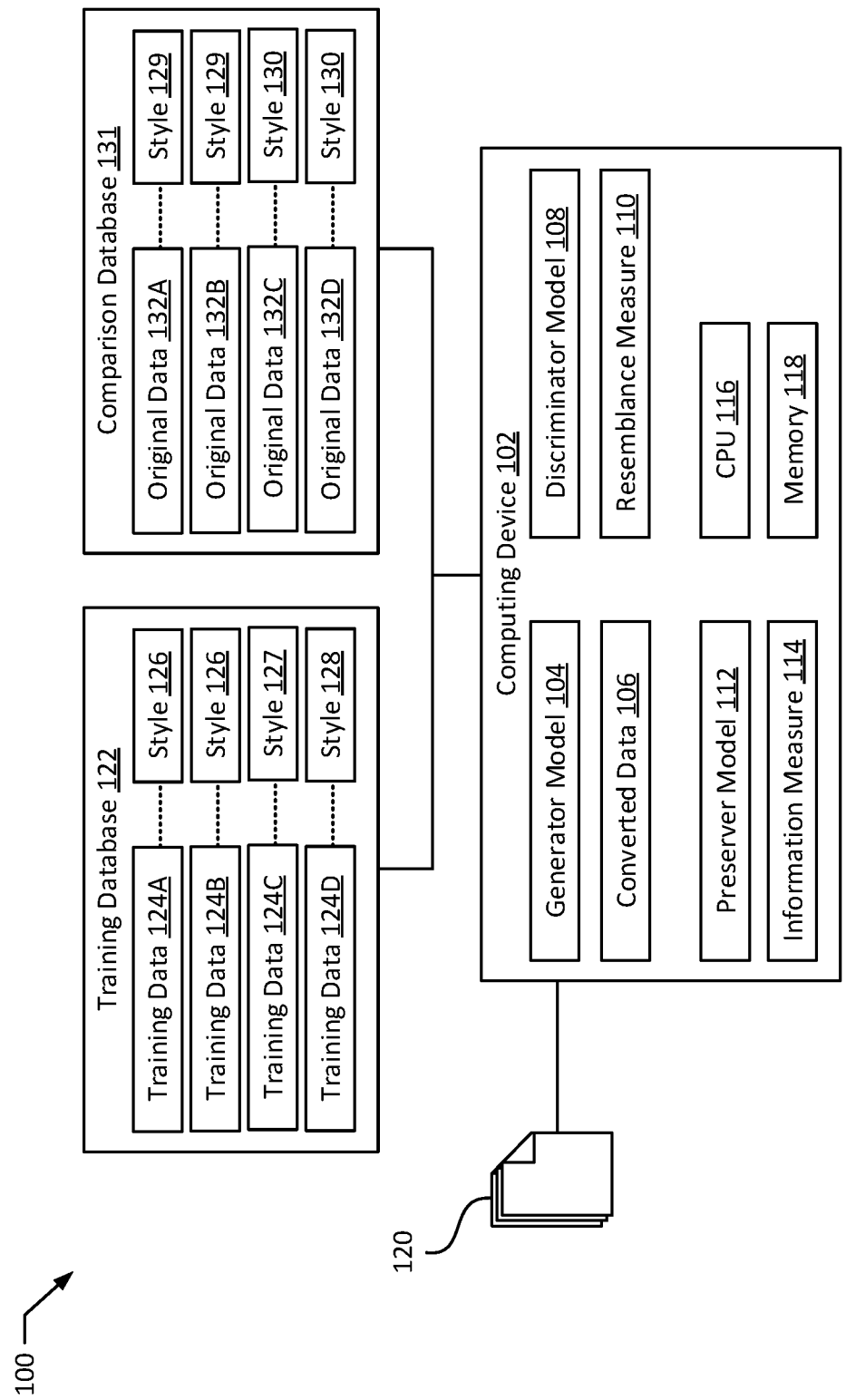
FIG. 1 illustrates a system according to an exemplary embodiment of the present disclosure.

In a particular instance, machine learning models often require significant amounts of exemplary data for training (e.g., "training data"). This training data typically must closely resemble the data that the machine learning model will process in the future. For the machine learning model to properly process this data, the training data typically has to be labeled to identify features of interest within the training data and/or a desired result from processing by the machine learning model. In a specific instance, machine learning models may be used to perform optical character recognition (OCR) on documents. Training data is typically required to refine these machine learning models (e.g., to improve their accuracy and/or to develop new features such as named entity recognition, table detection, or the like).

Over time, training a machine learning model to improve its accuracy may require the constant acquisition and preparation of new training data. Similarly, training the machine learning model to add or refine new features may require new types of training data (i.e., training data with different features or desired results labeled). Therefore, as models become more complex, acquiring and preparing the training data can represent a significant burden.

For certain types of machine learning models, data similar to typical training data (e.g., containing similar information) may be created using computer tools. Continuing the OCR processing described above, the machine learning model may be trained to process images of documents containing text (i.e., "text images"). Word processing programs and other computing tools may assist with preparing text images similar to those that are processed by the machine learning model. However, such tools may typically prepare text images that only include the text and do not include any errors or artifacts that would often be found in real-life scanned documents. By contrast, the OCR machine learning model may be configured to process scanned text images, which contain scanning errors, stray marks and notations, and scanning artifacts. Therefore, the computer-generated text images may be insufficient to train the OCR machine learning model.

In the above instance, the computer-generated text images that lack errors may be considered text line image data in a first style. The text line images with scanning artifacts and errors may be considered scanned text image data in a second style. In practice, styles of data may refer to certain categories, subsets, or characteristics of various types of data. For example, as used in this disclosure, a "data style" may refer to, e.g., data of a certain quality (e.g., high image quality, low image quality, high video quality, low video quality, high audio quality, low audio quality), data presented in a certain language (e.g., image data depicting text in a first/second language, video data depicting text in a first/second language, video data including audio in a first/second language, audio quality in a first/second language, text data in a first/second language), and data with a certain appearance (e.g., text images depicting text in a first/second font, image data with a certain type of visual appearance, video data with a certain appearance).

Similar situations may exist for other types of machine learning models. For example, computer tools exist to generate audio data based on text input (e.g., text-to-speech audio data). However, the generated audio data may sound different from what a human speaking the same text input would say. Therefore, a machine learning model being trained to recognize speech within spoken audio (e.g., to transcribe the spoken audio) may require a different style of audio data (e.g., spoken audio resembling a human speaking certain words) for proper training. Therefore, the computer-generated audio may not suffice for training the machine learning model.

Such scenarios are not limited to training machine learning models, however. In particular, data received in a first style is often needed in a second style. For example, image data may be received that is of poor or suboptimal quality, but may be needed in higher quality, e.g., for subsequent uses such as editing or analysis of the image data (e.g., x-ray or other medical scan images or videos to detect diagnosis information such as cancer detection, suspect areas for further review by a doctor). The quality of received video or audio data may similarly have to be improved. Relatedly, spoken audio may be received in a first language and may be needed in a second language, and vice versa (e.g., in a translation setting).

As can be seen in the above implementations, there exists a need to transform received data in a first style into data of a second style. One proposed solution to the above problem is to train a generator model to generate converted data in the second style based on received data in the first style. In particular, the generator model may be trained using two other models: a discriminator model and a preserver model. The discriminator model may be trained to distinguish between data in the first style and data in the second style. The preserver model may be trained to determine an amount information present in data of the second style. The determinations of the discriminator and preserver models may be provided to the generator model to ensure that the converted data is properly converted to the second style while also maintaining the information present in the received data of the first style.

FIG. 1 illustrates a system 100 according to an exemplary embodiment of the present disclosure. The system 100 may be utilized to receive data in a first style and to train the generator model 104 to properly convert the data into a second style. The system 100 includes a computing device 102, a training database 122, and a comparison database 131.

Figure 2A:
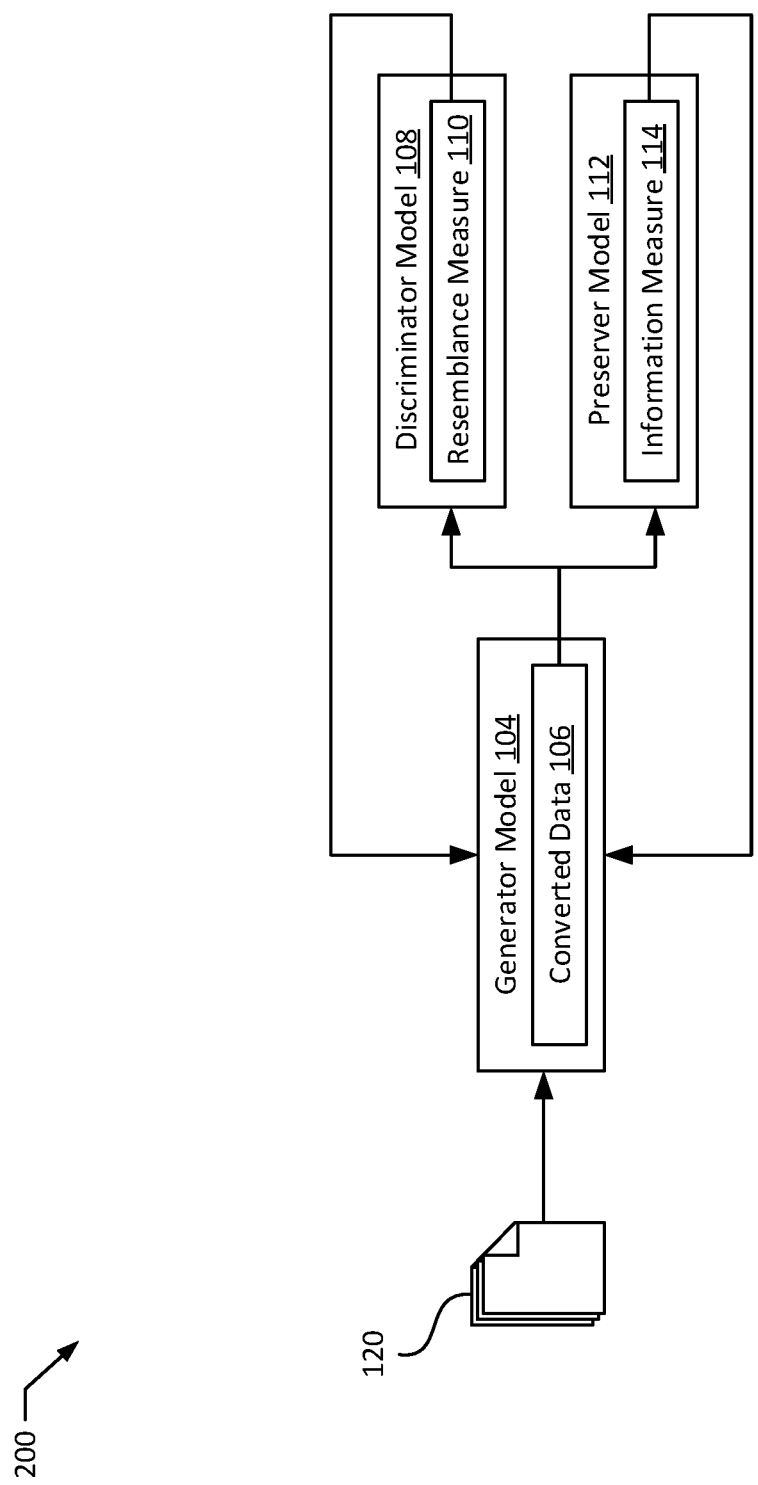
FIG. 2A illustrates a model process flow according to an exemplary embodiment of the present disclosure.

The computing device 102 includes a generator model 104, converted data 106, a discriminator model 108, a resemblance measure 110, a preserver model 112, an information measure 114, a CPU 116, and a memory 118. The computing device 102 may be configured to generate converted data 106 based on received data 120. In particular, the generator model 104 may be configured to generate the converted data 106 and the computing device 102 may be further configured to train the generator model 104 using the discriminator model 108 and the preserver model 112 to respectively generate a resemblance measure 110 and an information measure 114. In particular, and as depicted in the model arrangement 200 of FIG. 2, the generator model 104 may receive the received data 120 and generate the converted data 106 based on the received data 120. The received data 120 may be in a first style and the converted data 106 may be in a second style. The discriminator model 108 may receive the converted data 106 and generate a resemblance measure 110 based on the converted data 106. The resemblance measure 110 may measure how closely the converted data 106 resembles data in the second style, and therefore how well the converted data 106 was generated by the generator model 104. The preserver model 112 may receive the converted data 106 and may generate an information measure 114 indicating how much information was preserved within the converted data 106. For example, in generating the converted data 106 in certain instances, the generated model 104 may cause portions of the information contained in the received data 120 to be lost or degraded. The information measure 114, by measuring information preservation within the converted data 106, may indicate when such losses occur. Both the resemblance measure 110 and the information measure 114 may then be provided to the generator model 104 for training purposes, as described further below. By incorporating both the resemblance measure 110 and the information measure 114, the generator model 104 may, over the course of training, develop both superior conversion into the second style (e.g., based on the resemblance measure 110) and improved information retention during the conversion (e.g., based on the information measure 114).

One or more of the generator model 104, the discriminator model 108, and the preserver model 112 may be implemented by a machine learning model. For example, the models 104, 108, 112 may each be implemented by one or more supervised or unsupervised machine learning models. In certain such implementations, the models 104, 108, 112 may each be implemented by one or more neural networks, such as a convolutional neural network and/or a recurrent neural network. In further implementations, the discriminator model 108 may additionally or alternatively be implemented by a classifier machine learning model (e.g., a neural network classifier model, a nearest neighbor classifier model, a support vector machine model, a decision tree classifier model, a k means clustering model).

Figure 2B:
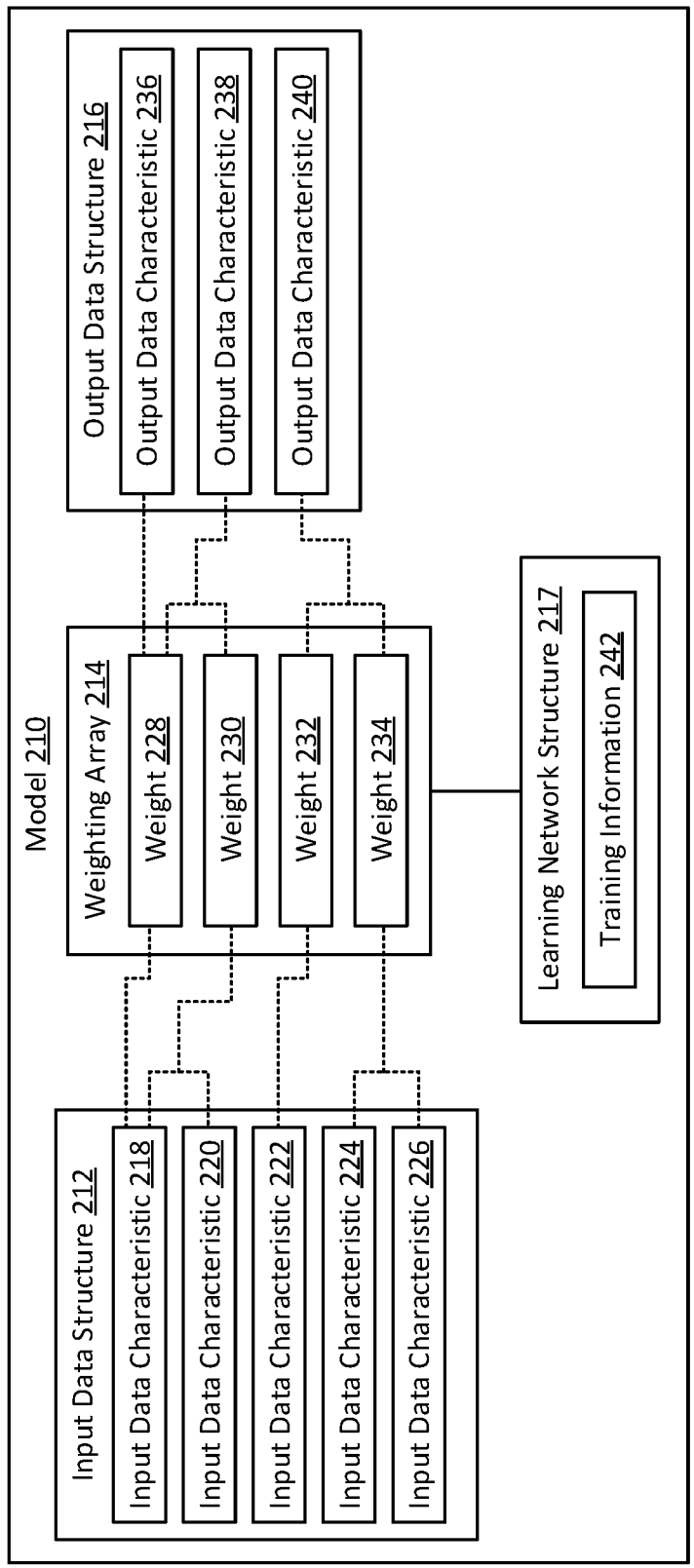
FIG. 2B illustrates a model according to an exemplary embodiment of the present disclosure.

For instance, and as depicted in FIG. 2B, one or more of the generator model 104, the discriminator model 108, and the preserver model 112 may be implemented as a model 210 including one or more of an input data structure 212, a weighting array 214, an output data structure 216, and a learning network structure 217. The input data structure 212 may represent the data received by the model 210. For example, the input data structure 212 may represent the received data 120 received by the generator model 104 and/or the converted data 106 received by the discriminator model 108 and the preserver model 112. The output data structure 216 may represent data created by and/or output by the model 210. For example, the output data structure 216 may represent the converted data 106 output by the generator model 104, the resemblance measure 110 output by the discriminator model 108, and/or the information measure 114 output by the preserver model 112. The input data structure 212 includes input data characteristics 218, 220, 222, 224, 226, which may represent particular features or other characteristics identified and/or analyzed by the model 210. For example, the input data characteristics 218, 220, 222, 224, 226 may represent features of the input data structure 212 relevant to creating the output data structure 216. For instance, where the input data structure 212 is received data 120 constituting documents, the input data characteristics 218, 220, 222, 224, 226 may represent particular characters and positions of the characters within the document. For instance, where the input data structure 212 is spoken audio data, the input data characteristics 218, 220, 222, 224, 226 may represent particular portions of audio signals that are typically correlated with certain spoken words or portions of spoken words. The output data structure 216 includes output data characteristics 236, 238, 240, which may represent particular features or data items that are relevant to accurately producing the output data structure 216. For example, where the output data structure 216 correspond to images generated to resemble scanned document images, the output data characteristics 236, 238, 240 may represent particular types of artifacts resembling scanning or other artifacts (e.g., to resemble characters that have been distorted during scanning) and/or may represent pixel arrangements corresponding to particular characteristics (e.g., to resemble characters that have not been distorted or have been minimally distorted during scanning).

The weighting array 214 may be configured to map between the data structure 212 and the output data structure 216. For example, the weighting array may be configured to generate the output data characteristics 236, 238, 240 and output data structure 216 based on the input data characteristics 218, 220, 222, 224, 226 and the input data structure 212. In particular, the weighting array 214 includes weights 228, 230, 232, 234, which may be configured to weight particular input data characteristics 218, 220, 222, 224, 226 while creating the output data structure 216 and the output data characteristics 236, 238, 240. Accordingly, each weight 228, 230, 232, 234 may correspond to particular input data characteristics 218, 220, 222, 224, 226 and/or particular output data characteristics 236, 238, 240. For example, the weight 228 corresponds to the input characteristic 218 and the output characteristics 236, 238 and the weight 230 corresponds to the input data characteristics 218, 220 and output characteristic 238. For instance, the weight 232 corresponds to input data characteristic 222 and output data characteristic 240 and the weight 234 corresponds to input data characteristics 224, 226 and output data characteristic 240. The weights 228, 230, 232, 234 may indicate a proportion for combining one or more of the corresponding input data characteristics 218, 220, 222, 224, 226 when generating the output data characteristic 236, 238, 240. For example, to generate the output data characteristic 240, the model 210 may combine the input data characteristics 222, 224, 226 according to magnitudes of the weights 232, 234 (e.g., a weight 232 with higher magnitude may cause the model 210 to combine a greater proportion of the input data characteristic 222 when generating the output characteristic 240 and a weight 232 with lower magnitude may cause the model 210 to combine a smaller proportion of the input data characteristic 222 when generating the output characteristic 240).

The learning network structure 217 may be configured to update the model 210 during training. For example, the learning network structure 217 may alter one or more of the weights 228, 230, 232, 234 during training of the model 210. For instance, the learning network structure 217 may add, remove, or alter one or more input data characteristics 218, 220, 222, 224, 226 and/or output data characteristics 236, 238, 240. During training, the learning network structure 217 may compare all or part of the output data structure 216 generated by the model 210 to training data indicating a desired output of the model 210.

For example, and returning to FIG. 1 and the system 100, the training database 122 stores training data 124A-D. Each of the training data 124A-D has an associated style 126-128. The training data 124A-D may represent source data for conversion into converted data 106 by the generator model 104 (e.g., the received data 120 may be received from the training database 122). The training database 122 may store training data 124A-D of multiple styles 126-128 for training of different generator models 104. Accordingly, a style 126-128 may be stored in association with the training data 124A-D. The style 126-128 may indicate what type of style the training data 124A-D is. For example, the styles 126-128 may include any of the above-discussed data styles. In one implementation, the style 126 may correspond to text images generated by a computer (e.g., text images lacking scanning artifacts or other errors).

For instance, the comparison database 131 stores original data 132A-D and associated styles 129, 130. The original data 132A-D may represent original data generated in a given style. For example, style 129 may represent text images with scanning artifacts (e.g., text images scanned in by a scanner of physical documents). The original data 132A-D may be used by the discriminator model 108's to calculate the resemblance measure 110. For example, the discriminator model 108 may compare the converted data 106 to original data 132A-D of the desired second style. Continuing the previous description, where the generator model 104 is configured to generate converted data 106 representing scanned text images, the discriminator model 108 may compare the converted data 106 to the original data 132A-B.

In certain implementations, the training database 122 and the comparison database 131 may be implemented by a single database. For example, the single database may store both training data 124A-D and original data 132A-D, along with associated styles 126-130. In such implementations, the appropriate data for use in, e.g., training or comparison, may be identified based on the associated style 126-130. For example, the computing device 102 may identify appropriate training data 124A-B of the desired first style 126 based on the stored association and the discriminator model 108 may identify appropriate original data 132A-B of the desired second style 129 based on the stored association. In still further implementations, the training database 122 and/or the comparison database 131 may be implemented as more than one database and/or more than one data table. For example, training data 124A-D of different styles 126-128 may be stored in separate databases, or separate tables within the training database 122. In particular, training data 124A-B of style 126 may be stored in a separate database or a separate data table, training data 124 of style 127 may be stored in a separate database and/or a separate data table, and/or training data 124D of style 128 may be stored in a separate database or a separate data table. Similarly, original data 132A-B of style 129 may be stored in a separate database and/or data table and/or original data 132C-D of style 130 may be stored in a separate database or separate data table.

As will be explained further below, the received data 120, the training data 124A-D, and the original data 132A-D may, in certain implementations, represent multiple data items. For example, where the training data 124A-B represent computer-generated text images, each of the training data 124A-B may include multiple text images (e.g., text images of multiple pages and/or documents). In such implementations, the training data 124A, 124B may represent separate data sets for use in training the generator model 104. Similarly, the original data 132A-B may each include multiple data items (e.g., multiple text images of scanned documents) and may each comprise a separate data set for comparison by the discriminator model 108.

One or more of the computing device 102, the training database 122, and the comparison database 131 may be implemented by a computing system. For example, the CPU 116 and the memory 118 may implement one or more aspects of the computing device 102, such as the generator model 104, the discriminator model 108, and the preserver model 112. For example, the memory 118 may store instructions which, when executed by the CPU 116, may perform one or more of the operational features of the computing device 102. Similarly, although not depicted, one or both of the training database 122 and the comparison database 131 may include a processor and a memory storing instructions which, when executed by the processor, cause the processor to implement one or more operational features of the training database 122 and/or the comparison database 131.

Figure 3:
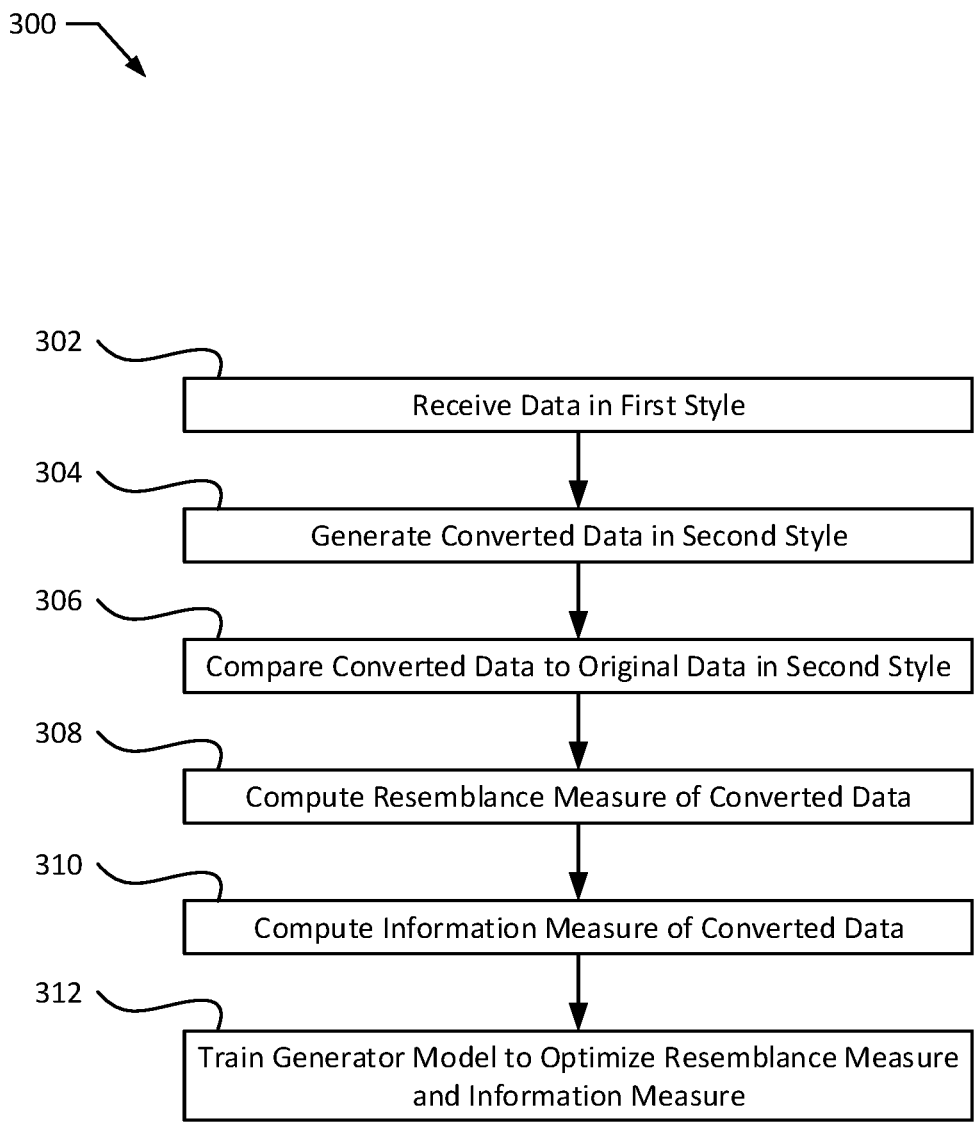
FIG. 3 illustrates a method according to an exemplary embodiment of the present disclosure.

FIG. 3 illustrates a method 300 according to an exemplary embodiment of the present disclosure. The method 300 may be performed to train the generator model 104 (e.g., to improve the quality of the converted data 106 generated by the generator model 104). The method 300 may be implemented on a computer system, such as the system 100. For example, the method 300 may be implemented by the computing device 102, the training database 122, and/or the comparison database 131. The method 300 may also be implemented by a set of instructions stored on a computer readable medium that, when executed by a processor, cause the computer system to perform the method. For example, all or part of the method 300 may be implemented by the CPU 116 and the memory 118. Although the examples below are discussed with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

Figure 4A:
FIGS. 4A-4C illustrate exemplary text line image data according to exemplary embodiments of the present disclosure.

The method 300 begins with receiving data in a first style (block 302). For example, the generator model 104 may receive received data 120 in a first style 126-130. The received data 120 may be received from one or both of a training database 122 and a comparison database 131, as discussed above. In further implementations, the received data 120 may be received from another source (e.g., a user request specifying data for use in training the generator model 104). In certain implementations, the computing device 102 and/or the generator model 104 may request training data 124A-D in a designated style 126-130. For example, the generator model 104 may be trained to convert computer-generated text images (e.g., images with few or no errors) into scanned text images. The style 127 stored in the training database 122 may correspond to computer-generated text images and may therefore be considered the first style. The computing device 102 may request the training data 124C of the first style 127 from the training database 122. The training data 124C may thus constitute the received data 120 received at block 302. FIG. 4A depicts an exemplary embodiment of received data 402 in the first style 127. As depicted, the received data 402 represents a computer-generated text image (e.g., a text image generated based on text input to a word processor or other computer tool). The received data 402 is essentially free from artifacts or other errors, indicating that the received data 402 was computer-generated. However, document scanners may typically introduce moderate numbers of artifacts or errors that partially blur or otherwise obscure the contents of a text image while still leaving the contents readable. Scanned documents may also have one or more blurring artifacts, stray marks, document blemishes (e.g., dirt, ink, or other substances on the document), damage, and/or other errors. Accordingly, a subsequent OCR model may have to account for such errors in recognizing text within scanned text images. For simplicity, the received data 402 only depicts a single word: "BRANCH." However, the received data 402 may represent only a portion of a text image. For example, a computer-generated text image may similar depict all or part of a document (e.g., multiple pages of text, a single page of text, multiple lines of text, a single line of text, or multiple words of text). Such embodiments may still constitute received data 402.

The converted data 106 may then be generated in a second style (block 304). For example, the generator model 104 may generate the converted data 106 in the second style based on the received data 120 in the first style 127. In particular, the generator model 104 may be initially configured to alter the received data 120 according to one or more characteristics of the received data 120 in order to generate the converted data 106. For example, the generator model 104 may identify one or more characteristics of the received data 120 and may generate the converted data 106 based on the identified characteristics (e.g., based on one or more weights or other model parameters associated with each of the identified characteristics). The generator model 104 may be previously trained or configured to generate the converted data 106. For example, the method 300 may be performed to improve the accuracy of the generator model 104. In such an implementation, the generator model 104 may have been previously trained for initial generation of the converted data 106. In such implementations, the generator model 104 may generate the converted data 106 based on the previous training or configuration. In the previous example, images resembling scanned documents (e.g., "scanned text images") may constitute the second style.

The converted data 106 may then be compared to the original data 132A-D in a second style 129-130 (block 306). For example, the discriminator model 108 may compare the original data 132A-D in the second style 129-130 to the converted data 106. For instance, style 129 may correspond to scanned text images and may therefore be considered the second style. The computing device 102 and/or the discriminator model 108 may query the comparison database 131 for original data 132A-B of the second style 129. The discriminator model 108 may then compare the converted data 106 to the original data 132A-B. For example, the discriminator model 108 may be separately trained to categorize data as either (i) being in the second style 129 or (ii) not being in the second style 129. In such implementations, the discriminator model 108 may compare the converted data 106 to the original data 132A-B by categorizing each of the one or more data items in the converted data 106 and each of the one or more data items in the original data 132A-B. For example, the discriminator model 108 may categorize each of these data items as either being in the second style 129 or not being in the second style 129. In performing this comparison, the discriminator model 108 may identify one or more characteristics within the analyzed data items that are indicative of being in the second style 129. The discriminator model 108 may additionally or alternatively identify one or more characteristics that are indicative of not being in the second style (e.g., according to one or more input data characteristics 218, 220, 222, 224, 226). The identified characteristics may then be combined (e.g., according to one or more weights 228, 230, 232, 234 or other model parameters) to determine whether analyzed data items are in the second style 129.

Figure 4B:
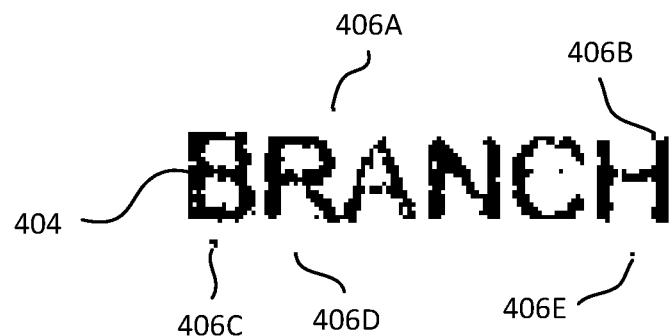

For instance, FIG. 4B depicts an exemplary embodiment of converted data 404 generated based on the received data 402. The converted data 404 contains multiple artifacts 406A-E (only a subset of which are numbered) and errors in the letters. The frequency and distribution of the errors and artifacts 406A-E may be typical of those introduced by scanners into scanned text images. The discriminator model 108 may be configured to analyze such characteristics of converted data 106 (e.g., the frequency and distribution of artifacts 406A-E and letter errors) to determine whether the converted data 106 is in the second style 129 of scanned text images. For example, when analyzing the converted data 404, the discriminator model 108 may identify characteristics such as the artifacts 406A-E and letter errors according to the parameters of the discriminator model 108. These identified characteristics may be combined, as described above, to determine whether the combined data 404 is in the second style 129. In implementations where the artifacts 406A-E and other errors within the converted data 404 resemble those within scanned text images (as depicted), the discriminator model 108 may determine, based on these identified characteristics, that the converted data 404 is in the second style 129.

Figure 4C:
Figure 5A:
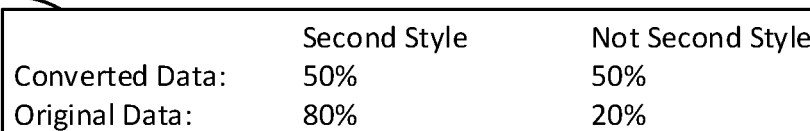
FIGS. 5A-5D illustrate exemplary style comparisons according to exemplary embodiments of the present disclosure.
Figure 5B:
Figure 5C:
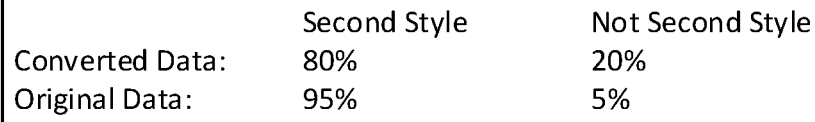
Figure 5D:
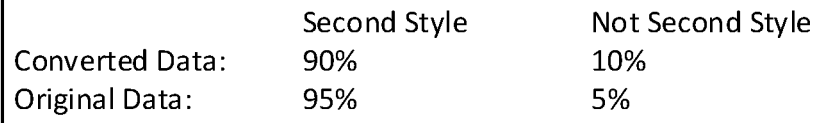

By contrast, FIG. 4C depicts another exemplary embodiment of converted data 408, which the generator model 104 may have generated based on the received data 402 to resemble a scanned text image. Compared to the converted data 404, the converted data 408 has more artifacts (not numbered for simplicity) and more letter errors, especially for the letters "A" and "N." The frequency and distribution of these additional artifacts and errors may be atypical of scanned text images. Therefore, by examining the same characteristics discussed above, the discriminator 108 may determine that the additional errors do not correspond to typical characteristics of scanned text images and may categorize the converted data 408 as not in the second style 129.

In certain implementations, and as explained above, the converted data 106 and the original data 132A-B may include more than one data item. In such implementations, the discriminator model 108 may classify each data item of the converted data 106 and the original data 132A-B separately.

A resemblance measure 110 may then be computed for the converted data 106 (block 308). For example, the computing device 102 and/or the discriminator model 108 may calculate the resemblance measure 110 based on the comparison performed at block 306. The resemblance measure 110 may indicate how closely the converted data 106 resembles the original data 132A-B of the second style 129. In implementations where the converted data 106 includes a single data unit (e.g., a single text image), the resemblance measure 110 may indicate whether the discriminator model 108 identified the converted data 106 as being in the second style. For example, the resemblance measure 110 may be a binary indicator set based on the determination of the discriminator model 108.

In implementations where the converted data 106 and/or the original data 132A-B include multiple data items, the resemblance measure 110 may be based on a proportion of each of the original data 132A-B and the converted data 106 that were categorized as being in the second style. For example, FIGS. 5A-5D depict comparison results 502, 504, 506, 508. The comparison results 502, 504, 506, 508 each identify a percentage of data items from the converted data 106 and the original data 132A-B identified as being in the second style 129 and as not being in the second style 129.

For example, the comparison result 502 indicates that 50% of the data items from the converted data 106 were categorized as being in the second style 129 and 50% were identified as not being in the second style 179. By contrast, 80% of the data items in the original data 132A-B were identified as being in the second style 129 and 20% were identified as not being in the second style 129. Accordingly, because a lower percentage of the converted data 106 are classified as being in the second style 129, the resemblance measure 110 may be generated to indicate that the converted data 106 does not resemble the original data 132A-D. Similarly, the comparison result 506 indicates that 80% of the converted data 106 data items were classified as being in the second style 129, while 95% of the original data 132 data items were classified as being in the second style 129. Even though the converted data 106 in this result has a relatively high percentage of data items classified as being in the second style 129 compared to the comparison result 502, the resemblance measure 110 may still be generated to indicate that the converted data 106 does not resemble the original data 132A-B, as a higher percentage of the original data 132A-B data items were classified as being in the second style 129. However, if the percentages are closer for the converted data 106 and the original data 132A-B (e.g., less than a particular difference threshold), the resemblance measure 110 may be calculated to indicate that the converted data 106 resembles the original data 132A-B. For example, the comparison result 504 indicates that 75% of the converted data 106 data items were classified as being in the second style 129, while 80% of the original data 132A-B data items were classified as being in the second style 129. The comparatively smaller percentage difference (5%) compared to the comparison result 502 (30%) may be sufficient to determine that the converted data 106, on the whole, resemble the original data 132A-B. The computing device 102 and/or the discriminator model 108 may accordingly generate the resemblance measure 110 to indicate that the converted data 106 resembles the original data 132A-B in the second style 129. Similarly, comparison result 508 indicates that 90% of the converted data 106 data items were classified as being in the second style 129, while 95% of the original data 132A-B data items were classified as being in the second style 129. Similar to the comparison result 504, the resemblance measure 110 may therefore be calculated to indicate that the converted data 106 resembles the original data 132A-B. In certain instances, the discriminator model 108 and/or the computing device 102 may require a smaller difference threshold (e.g., 3%, 1%, 0.5%, 0.05%) to determine that the converted data 106 resembles the original data 132A-B. Additionally, although not depicted in the comparison results 502, 504, 506, 508, the resemblance measure 110 may be calculated to indicate that the converted data 106 resembles the original data 132A-B if the percentage of converted data 106 data items classified as being in the second style 129 exceeds the percentage of original data 132A-B data items classified as being in the second style 129. For example, if, in the comparison result 504, 83% of the converted data 106 data items were classified as being in the second style 129, the resemblance measure 110 may be computed to indicate that the converted data 106 resembles the original data 132A-B.

In certain instances, the resemblance measure 110 may be calculated for converted data 106 containing multiple data items as a binary indicator of whether the converted data 106 resembles the original data 132A-B. In other implementations, the resemblance measure 110 may be calculated as a value indicating a relative level of similarity between the converted data 106 and the original data 132A-B. For example, the resemblance measure 110 may indicate a relative difference in the percentage of converted data 106 and original data 132A-B data items classified as being in the second style 129. For instance, the resemblance measure 110 may be computed for the comparison results 502, 504, 506, 508 as 30%, 5%, 15%, and 5%, respectively. In such implementations, a lower resemblance measure 110 may indicate a higher level of similarity. Based on the above, one skilled in the art may recognize additional implementations of the resemblance measure 110, including implementations where higher resemblance measure 110 indicate a higher level of similarity between the converted data 106 and the original data 132A-B. The present disclosure contemplates such implementations.

An information measure 114 may then be computed for the converted data 106 (block 310). For example, the preserver model 112 may compute the information measure 114 based on the converted data 106. In particular, the preserver model 112 may compute the information measure 114 to indicate how much information is preserved within the converted data 106. The preserver model 112 may, in certain implementations, be separately trained to measure the information present in the converted data 106 (e.g., data of the second style 129), similar to how the discriminator model 108 may be separately trained to determine whether data is in the second style 129. For instance, where the generator model 104 is trained to generate converted data 106 for use in training an OCR model, the preserver model 112 may calculate the information measure 114 by attempting to recognize characters within the converted data 106. For example, after receiving the converted data 404, the preserver model 112 may attempt to perform optical character recognition on the converted data 404. As discussed above, although the converted data 404 includes artifacts 406 A-E and errors to certain letters, the letters are all still generally readable. Accordingly, the preserver model 112 may be able to detect characters for all five letters in "BRANCH." Because the preserver model 112 is able to recognize all of the characters in the converted data 404, the information measure 114 may be computed to indicate a high level of information preserved within the converted data 404. By contrast, the converted data 408 includes further artifacts and further degradation of the letters "A" and "N." Therefore, the preserver model 112 may only detect characters for "B," "R," "C," and "H." Because the preserver model 112 is only able to recognize three of the five characters in the converted data 408, the information measure 114 may be computed to indicate a lower level of information preserved within the converted data 404.

In certain implementations, to compute the information 114, the preserver model 112 may compare the information detected within the converted data 106 to expected information from the received data 120. For example, where the received data 120 is computer-generated, the received data 120 may indicate expected information contained within the received data 120 (e.g., text depicted by text images). The preserver model 112 and/or the computing device 102 may then receive the expected information and compare the expected information to the information extracted from the converted data 106. For example, after extracting the letters "B," "R," "C," and "H," the computing device 102 and/or the preserver model 112 may compare the extracted letters to be expected information of "BRANCH." Based on this comparison, the computing device 102 and/or the preserver model 112 may determine that the preserver model 112 is only able to extract four of the five expected letters originally contained within the received data 402.

The generator model 104 may then be trained to optimize the resemblance measure 110 and/or the information measure 114 (block 312). The computing device 102 may update one or more parameters of the generator model 104 based on the resemblance measure 110 on the information measure 114. For example, the computing device 102 (e.g., via the learning network structure 217) may add, alter, or remove one or more input data characteristics 218, 220, 222, 224, 226, weights 228, 230, 232, 234, and/or output data characteristics 236, 238, 240 of the generator model 104. In particular, if either or both of the resemblance measure 110 and the information measure 114 are insufficient (e.g., below a certain predetermined threshold), the computing device 102 may alter the model parameters at the generator model 104 to improve either or both of the resemblance measure 110 and the information measure 114. In certain implementations, the resemblance measure 110 and the information measure 114 may have separate predetermined thresholds (e.g., the resemblance measure 110 may be required to fulfill a first predetermined threshold and the information measure 114 may be required to fulfill a second predetermined threshold). In other implementations, which may be preferred, the resemblance measure 110 and the information threshold 114 may both, in combination, be required to fulfill a single threshold. In certain implementations, and as explained further below, the generator model 104 may be iteratively trained to separately optimize the resemblance measure 110 and the information measure 114. In such implementations, only one of the resemblance measure 110 or the information measure 114 may be computed, depending on whether the generator model 104 is respectively being trained to optimize the resemblance measure 110 or the information measure 114.

Figure 6:
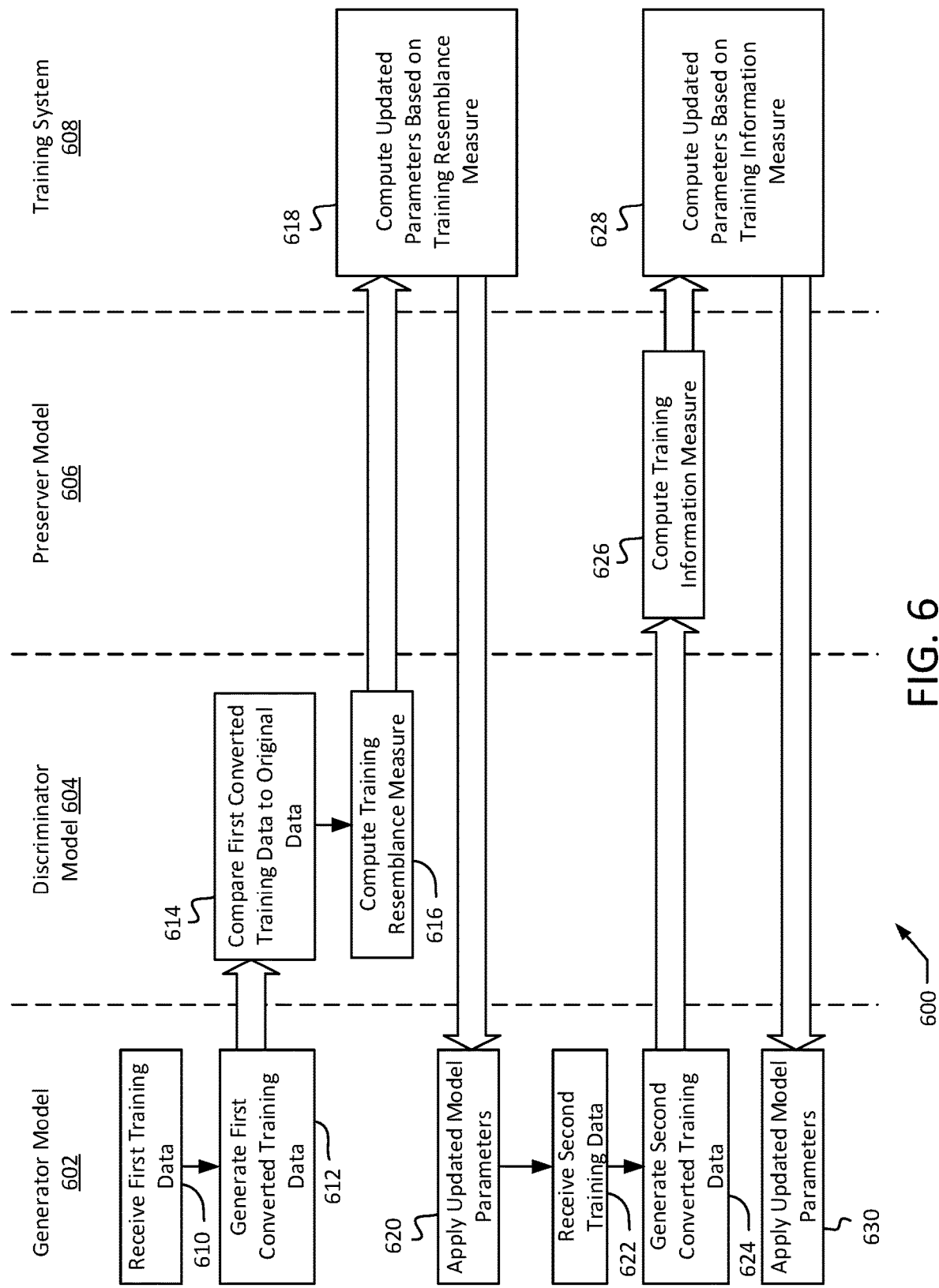
FIG. 6 illustrates a flow chart of a method according to an exemplary embodiment of the present disclosure.

FIG. 6 illustrates a flow diagram of a method 600 according to an exemplary embodiment of the present disclosure. The flow diagram includes a generator model 602, which may be an exemplary implementation of the generated model 104, a discriminator model 604, which may be an exemplary implementation of the discriminator model 108, a preserver model 606, which may be an exemplary implementation of the preserver model 112, and a training system 608. The training system 608 may be configured to orchestrate the operation of the method 600 in order to generate updated model parameters based on the outputs generated during the training, as detailed below. In some implementations, the training system 608 may be implemented at least in part by the computing device 102. In additional or alternative implementations, the training system 608 may be implemented at least in part by the learning network structure 217.

The method 600 may be performed to train the generated model 602, which may improve the quality of the converted data 106 generated by the generated model 602. For example, training the generator model 602 may improve the resemblance measure 110, indicating that the converted data 106 more closely resembles the original data 132A-D of the second style 129-130. Additionally or alternatively, training the generator model 602 may improve the information measure 114, indicating that the converted data 106 retains more of the information initially present in the received data 120.

The method 600 may be implemented on a computer system, such as the system 100. For example, the method 600 may be implemented by the computing device 102, the training database 122, and/or the comparison database 131. The method 600 may also be implemented by a set of instructions stored on a computer readable medium that, when executed by a processor, cause the computer system to perform the method. For example, all or part of the method 600 may be implemented by the CPU 116 and the memory 118. Although the examples below are discussed with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

Additionally, FIG. 6 depicts multiple communications between the generator model 602, the discriminator model 604, the preserver model 606, and the training system 608. These communications may be transmissions between multiple pieces of hardware or may be exchanges between different programmatic modules of software. For example, the communications may be transmissions over a network between multiple computing systems, such as over the Internet or a local networking connection. These transmissions may occur over a wired or wireless interface. The communications may also be exchanges between software modules, performed through an application programming interface (API), or other established communication protocols.

The method 600 begins with the generator model 602 receiving first training data (block 610). The first training data may be in the first style and may be received as the received data 120. In particular, the first training data may be received from the training database 122, as discussed above. For example, the generator model 602 may be trained to generate spoken audio data based on received, computer-generated audio data (e.g., text-to-speech data that does not resemble human speech). In such an instance, the style 126 in the training database 122 may correspond to computer-generated audio data and the style 126 may therefore be considered the first style. The training system 608 and/or the generator model 602 may therefore request training data 124A-B of the style 126 from the training database 122. In particular, the training system 608 and/or the generator model 602 may request specific training data 124A for use as the first training data.

Based on the received first training data 124A, the generator model 602 may generate first converted training data (block 612). As discussed above, the generator model 104 be previously configured (e.g., trained) to generate converted data based on the received data. Accordingly, the generator model 602 may generate the first converted training data according to this previous configuration. For instance, the first converted training data may be generated as spoken audio data based on the computer-generated audio data contained within the first training data 124A.

The discriminator model 604 may then compare the first converted training data to original data 132A-D in the second style 129-130 (block 614). For instance, where the first converted training data is generated as spoken audio data, spoken audio data may constitute the second style and may be represented by style 130 in the comparison database 131. The discriminator model 604 may accordingly compare the first converted training data to original data 132 C-D of the second style 130 according to the techniques discussed above in connection with the method 300. The discriminator model 604 may also compute a training resemblance measure for the first converted training data based on the comparison (block 616). The training resemblance measure may be computed according to the techniques discussed above in connection with the resemblance measure 110 and the method 300.

The training system 608 may then compute updated parameters for the generator model 602 based on the training resemblance measure (block 608). The updated model parameters may be generated to improve the resemblance measure for subsequently-generated converted data. For example, the updated model parameters may be generated to change which characteristics of received data are considered when generating the converted data (e.g., to add, remove, or alter one or more of the input data characteristics 218, 220, 222, 224, 226). Additionally or alternatively, the updated model parameters may be generated to change how the generator model 602 weights certain characteristics of received data (e.g., to add, remove, or alter one or more of the weights 228, 230, 232, 234). In still further implementations, the updated model parameters may be generated to alter the dependencies between certain characteristics (e.g., how certain characteristics are compared to one another during generation of the converted data). For instance, the updated parameters may be generated to change one or more characteristics generated for the converted data 106 (e.g., to add, remove, or alter one or more of the output data characteristics 236, 238, 240 of the generator model 602). The generator model 602 may then receive the updated model parameters and be updated to incorporate the model parameters (block 620).

The generator model 602 may then receive second training data (block 622). The second training data may also be in the first style 126 and may be received from the training database 122 similar to the first training data. Returning to the previous instance, the training system 608 and/or the generator model 602 may request training data 124B of the first style 126 for use as the second training data, as training data 124A was previously received as the first training data at block 610. In practice, the training database 122 may include dozens, hundreds, or even thousands of training data items. In such instances, the training data items may be subdivided into datasets for use as the first and/or second training data. Further, training data may be reused in certain implementations (e.g., in new combinations of training data items) to subsequently serve as part of a training dataset (e.g., the training data 124A-B).

Based on the received second training data 124B, the generator model 602 may generate second converted training data (block 624). The generator model 602 may generate the second converted training data using techniques similar to those discussed above in connection with the method 300 and the block 612. As with the first converted training data, in the previous instance, the second converted training data may be generated as spoken audio data based on the computer-generated audio data contained within the second training data 124B.

The preserver model 606 may then compute a training information measure based on the second converted training measure (block 626). The training information measure may be computed similar to the information measure 114, e.g., to indicate how much information is preserved within the second converted training data as compared to the second training data. Continuing the previous instance, the preserver model 606 may calculate the training information measure by extracting textual information from the spoken audio data in the second converted training data (e.g., textual information reflecting the content spoken in the spoken audio data). The preserver model 606 may then determine how much information was able to be extracted from the second converted training data. For example, because the second training data 124B was computer-generated, the second training data 124B may include the textual information from which the audio data was generated. The preserver model 606 may then compare the textual information from the second training data 124B to the textual information extracted from the second converted training data to compute the training information measure. In particular, the preserver model 606 may compute the training information measure based on a percentage or proportion of the textual information that was successfully or accurately extracted from the second converted training data, similar to computing the information measure 114, as discussed above in connection with the method 300.

The training system 608 may then compute updated parameters for the generator model 602 based on the training information measure (block 628) and the generator model 602 may then apply the updated model parameters (block 630). Blocks 628, 630 may be implemented similar to blocks 618, 620, but with the updated parameters computed to improve the resemblance measure for subsequently-generated converted data.

Certain blocks or groups of blocks may be performed multiple times. For example, blocks 610-620 may be repeated multiple times to optimize the generator model 602 based on the training resemblance measure. Similarly, blocks 622-630 may be repeated multiple times to optimize the generator model 602 based on the training information measure. In certain implementations, blocks 610-620 may be repeated multiple times before proceeding to block 622. In still further implementations, blocks 622-630 may be performed before block 610. In such implementations, blocks 622-630 may be repeated multiple times before block 610. As another example, blocks 610-616 may be repeated multiple times before computing the updated parameters at block 618. For example, where the first training data contains a single data item or relatively few data items, blocks 610-616 may be repeated to provide a training resemblance measure based on sufficient data items to compute updated parameters. Blocks 622-626 may similarly be repeated multiple times before computing the updated parameters at block 628. In further implementations, both the training resemblance measure and the training information measure may be calculated based on one or both of the first converted training data and the second converted training data. In such implementations, the training system 608 may calculated the updated parameters for the generator model 602 based on both the training resemblance measure and the training information measure.

The method 600 may accordingly be performed to iteratively train the generator model 602 to improve both the training resemblance measure and the training information measure, thereby improving how well the converted training data resembles the second style while also maintaining the information initially present in the training data. The iterative training may be repeated until one or both of the training resemblance measure and the training information measure fulfill one or more predetermined thresholds (e.g., meet a sufficient accuracy requirement), as discussed above in connection with block 312. In additional or alternative implementations, the method 600 may be repeated a predetermined number of times, or until a certain number of training data items are processed.

It should also be understood that the data and computed information measures and resemblance measures discussed above in connection with the method 600 may be exemplary implementations of the data and computed information measures and resemblance measures of the system 100. For example, the first and second training data may be exemplary implementations of the training data 124A-D and the first and second converted training data may be exemplary implementations of the converted data 106. Relatedly, the training resemblance measure may be an exemplary implementation of the resemblance measure 110 and the training information measure may be an exemplary implementation of the information measure 114.

Further, any of the examples, instances, or implementations discussed above in connection with the methods 300, 600 may be performed in connection with executing either method 300, 600. For example, the techniques discussed in connection with the method 300 for training the generator model 104 to generate scanned text images may be similarly performed in connection with training a generator model 602 to generate scanned text images in the method 600. For instance, the techniques discussed in connection with the method 600 for training the generator model 602 to generate spoken audio may be similarly performed in connection with training a generator model 104 to generate spoken audio in the method 300.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system comprising:
a processor; and
a memory storing instructions which, when executed by the processor, cause the processor to implement:
a generator model configured to receive data in a first style and generate converted data in a second style;
a discriminator model configured to receive the converted data from the generator model, compare the converted data to original data in the second style, and compute a resemblance measure based on the comparison; and
a preserver model configured to receive the converted data from the generator model, recognize information within the converted data, and compute an information measure of the converted data based on a proportion of the converted data for which information is recognized,
wherein the generator model is trained to optimize the resemblance measure and the information measure.

2. The system of claim 1, wherein the discriminator model is further configured to:
receive the converted data and the original data; and
classify data items within the converted data and data items within the original data as being in the first style or the second style,
wherein the resemblance measure is computed based on a proportion of data items within the converted data classified as being in the second style.

3. The system of claim 1, wherein the memory contains further instructions which, when executed by the processor, cause the processor to:
iteratively train the generator model based on either the resemblance measure or the information measure.

4. The system of claim 3, wherein the memory contains further instructions which, when executed by the processor while training the generator model based on the resemblance measure, cause the processor to:
receive, at the generator model, first training data in the first style and generate first converted training data in the second style;
receive, at the discriminator model, the first converted training data, compare the first converted training data to the original data, and compute a training resemblance measure based on the comparison; and
receive the training resemblance measure and update the generator model based on the training resemblance measure.

5. The system of claim 4, wherein the generator model is trained based on the training resemblance measure until the training resemblance measure exceeds a first predetermined threshold.

6. The system of claim 3, wherein the memory contains further instructions which, when executed by the processor while training the generator model based on the information measure, cause the processor to:
receive, at the generator model, second training data in the first style and generate second converted training data in the second style;
receive, at the preserver model, the second converted training data and compute a training information measure of the second converted training data; and
receive the training information measure and update the generator model based on the training information measure.

7. The system of claim 6, wherein the generator model is trained based on the training information measure until the training information measure exceeds a second predetermined threshold.

8. The system of claim 3, wherein one or both of the discriminator model and the preserver model are separately trained prior to training the generator model.

9. The system of claim 1, wherein data in the first style includes one or more types of data selected from the group consisting of: images of high quality, text images in a first font, images of low quality, spoken audio of low quality, spoken audio in a first language, video of high quality, and video of a low quality, and
wherein data in the second style includes one or more types of data selected from the group consisting of: images of lower quality, text images in a second font, images of higher quality, spoken audio of higher quality, spoken audio in a second language, video of lower quality, and video of higher quality.

10. The system of claim 9, wherein data in the first style includes high-quality text images and wherein data in the second style includes text images of lower quality to resemble scanned text images.

11. The system of claim 10, wherein the generator model is configured, while generating the converted data in the second style, to generate at least one image degradation resembling at least one type of error selected from the group consisting of: scanning artifacts, document damage, blurring errors, stray markings, and document blemishes.

12. The system of claim 10, wherein the preserver model is configured to:
recognize values corresponding to characters within the converted data; and
compute the information measure based on a proportion of characters within the converted data for which corresponding values were successfully identified.

13. The system of claim 10, wherein the memory stores further instructions which, when executed by the processor, cause the processor to:
store the converted data for use in training a model configured to recognize text within scanned text images.

14. A method comprising:
receiving, at a generator model, data in a first style;
generating, with the generator model, converted data in a second style;
comparing, with a discriminator model, the converted data to original data in the second style;
computing, with the discriminator model, a resemblance measure based on the comparison;
recognizing, with a preserver model, information within the converted data;
computing, with the preserver model, an information measure of the converted data based on a proportion of the converted data for which information is recognized; and
training the generator model to optimize the resemblance measure and the information measure.

15. The method of claim 14, further comprising:
receiving, with the discriminator model, the converted data and the original data; and
classifying, with the discriminator model, data items within the converted data and data items within the original data as being in the first style or the second style, and
wherein the resemblance measure is computed based on a proportion of data items within the converted data classified as being in the second style.

16. The method of claim 14, further comprising:
iteratively training the generator model based on either the resemblance measure or the information.

17. The method of claim 16, wherein training the generator model based on the resemblance measure further comprises:
receiving, at the generator model, first training data in the first style;
generating, with the generator model, first converted training data in the second style;
comparing, with the discriminator model, the first converted training data to the original data;
computing, with the discriminator model, a training resemblance measure based on the comparison; and
updating the generator model based on the training resemblance measure.

18. The method of claim 17, wherein the generator model is trained based on the training resemblance measure until the training resemblance measure exceeds a first predetermined threshold.

19. The method of claim 16, wherein training the generator model based on the information measure further comprises:
receiving, at the generator model, second training data in the first style;
generating, with the generator model, second converted training data in the second style;
computing, with the preserver model, a training information measure of the second converted training data; and
updating the generator model based on the training information measure.

20. The method of claim 19, wherein the generator model is trained based on the training information measure until the training information measure exceeds a second predetermined threshold.

21. The method of claim 16, wherein one or both of the discriminator model and the preserver model are separately trained prior to training the generator model.

22. The method of claim 14, wherein data in the first style includes one or more types of data selected from the group consisting of: images of high quality, text images in a first font, images of low quality, spoken audio of low quality, spoken audio in a first language, video of high quality, and video of a low quality, and
wherein data in the second style includes one or more types of data selected from the group consisting of: images of lower quality, text images in a second font, images of higher quality, spoken audio of higher quality, spoken audio in a second language, video of lower quality, and video of higher quality.

23. The method of claim 22, wherein data in the first style includes high-quality text images and wherein data in the second style includes text images of lower quality to resemble scanned text images.

24. The method of claim 23, wherein generating the converted data in the second style includes generating at least one image degradation resembling at least one type of error selected from the group consisting of: scanning artifacts, document damage, blurring errors, stray markings, and document blemishes.

25. The method of claim 23, further comprising:
recognizing, with the preserver model, values corresponding to characters within the converted data; and
computing, with the preserver model, the information measure based on a proportion of characters within the converted data for which corresponding values were successfully identified.

26. The method of claim 23, further comprising:
storing the converted data for use in training a model configured to recognize text within scanned text images.

27. A non-transitory, computer-readable medium storing instructions which, when executed by a processor, cause the processor to:
receive, at a generator model, data in a first style;
generate, with the generator model, converted data in a second style;
compare, with a discriminator model, the converted data to original data in the second style;
compute, with the discriminator model, a resemblance measure based on the comparison;
recognize, with a preserver model, information within the converted data;
compute, with the preserver model, an information measure of the converted data based on a proportion of the converted data for which information is recognized; and train the generator model to optimize the resemblance measure and the information measure.

28. A system comprising:
a processor; and
a memory storing instructions which, when executed by the processor, cause the processor to implement:
a generator model configured to receive data in a first style and generate converted data in a second style;
a discriminator model configured to:
  receive the converted data from the generator model and the original data, compare the converted data to original data in the second style,
  compute a resemblance measure based on the comparison,
  classify data items within the converted data and data items within the original data as being in the first style or the second style, wherein the resemblance measure is computed based on a proportion of data items within the converted data classified as being in the second style, and
a preserver model configured to receive the converted data from the generator model and compute an information measure of the converted data,
wherein the generator model is trained to optimize the resemblance measure and the information measure.

29. A method comprising:
receiving, at a generator model, data in a first style;
generating, with the generator model, converted data in a second style;
comparing, with a discriminator model, the converted data to original data in the second style;
receiving, with the discriminator model, the converted data and the original data;
classifying, with the discriminator model, data items within the converted data and data items within the original data as being in the first style or the second style;
computing, with the discriminator model, a resemblance measure based on the comparison, wherein the resemblance measure is computed based on a proportion of data items within the converted data classified as being in the second style;
computing, with a preserver model, an information measure of the converted data; and
training the generator model to optimize the resemblance measure and the information measure.

* * * * *